United States Patent
Dharmarajan et al.

(10) Patent No.: US 11,390,734 B2
(45) Date of Patent: *Jul. 19, 2022

(54) ELASTOMERIC TERPOLYMER COMPOSITIONS FOR CORNER MOLDING APPLICATIONS

(71) Applicant: ExxonMobil Chemical Patents Inc., Baytown, TX (US)

(72) Inventors: Narayanaswami Dharmarajan, Houston, TX (US); Scott H. Loyd, League City, TX (US); Milind Balwant Joshi, Karnataka (IN)

(73) Assignee: ExxonMobil Chemical Patents Inc., Baytown, TX (US)

( * ) Notice: Subject to any disclaimer, the term of this patent is extended or adjusted under 35 U.S.C. 154(b) by 77 days.

This patent is subject to a terminal disclaimer.

(21) Appl. No.: 16/770,679

(22) PCT Filed: Nov. 5, 2018

(86) PCT No.: PCT/US2018/059159
§ 371 (c)(1),
(2) Date: Jun. 8, 2020

(87) PCT Pub. No.: WO2019/112728
PCT Pub. Date: Jun. 13, 2019

(65) Prior Publication Data
US 2021/0371634 A1    Dec. 2, 2021

Related U.S. Application Data

(60) Provisional application No. 62/596,266, filed on Dec. 8, 2017.

(51) Int. Cl.
*C08L 23/16* (2006.01)
*C08F 236/04* (2006.01)
*C08L 23/08* (2006.01)

(52) U.S. Cl.
CPC .......... *C08L 23/16* (2013.01); *C08F 236/045* (2013.01); *C08L 23/08* (2013.01);
(Continued)

(58) Field of Classification Search
None
See application file for complete search history.

(56) References Cited

U.S. PATENT DOCUMENTS

| 5,571,868 A | 11/1996 | Datta et al. |
| 5,654,370 A | 8/1997 | Datta et al. |

(Continued)

FOREIGN PATENT DOCUMENTS

| EP | 0 990 675 | 4/2000 |
| EP | 2 541 621 | 1/2013 |

(Continued)

OTHER PUBLICATIONS

J. R. Beatty, "Tel-Tak: A Mechanical Method for Estimating Both Tackiness and Stickness of Rubber Compounds", Rubber Chemistry and Technology, vol. 42, pp. 1040-1053 (1969).

(Continued)

*Primary Examiner* — Richard A Huhn

(57) ABSTRACT

Disclosed herein is a composition comprising from 5 to 20 parts by weight per hundred parts by weight rubber (phr) of a propylene-α-olefin-diene (PEDM) terpolymer comprising 1 to 10 wt % diene, 5 to 40 wt % α-olefin, and 15 to 85 wt % propylene, said wt % based on the weight of the PEDM terpolymer; and from 80 to 95 phr of an ethylene-based copolymer comprising ethylene, one or more $C_3$ to $C_{12}$ α-olefins, and, optionally, one or more dienes; wherein the amount of ethylene content of the ethylene-based copolymer (in wt % on the basis of total weight of the ethylene-based
(Continued)

copolymer) is greater than the amount of α-olefin content of the PEDM terpolymer (in wt % on the basis of total weight of the PEDM terpolymer).

21 Claims, 2 Drawing Sheets

(52) U.S. Cl.
CPC ..... *C08L 2205/025* (2013.01); *C08L 2205/03* (2013.01); *C08L 2207/322* (2013.01); *C08L 2312/00* (2013.01); *C08L 2314/06* (2013.01)

(56) References Cited

U.S. PATENT DOCUMENTS

| | | |
|---|---|---|
| 7,199,189 B2 | 4/2007 | Ravishankar et al. |
| 11,053,381 B2 * | 7/2021 | Dharmarajan ............ F16G 1/06 |
| 2013/0050488 A1 | 2/2013 | Brouard et al. |
| 2013/0098494 A1 | 4/2013 | Yajima et al. |
| 2017/0233513 A1 | 8/2017 | Tsou et al. |

FOREIGN PATENT DOCUMENTS

| | | |
|---|---|---|
| EP | 2 724 841 | 4/2014 |
| WO | 03/050148 | 6/2004 |
| WO | 2008/094741 | 8/2008 |
| WO | 2011/041230 | 4/2011 |

OTHER PUBLICATIONS

G. R. Hamed, "Tack and Green Strength of Elastomeric Materials", Rubber Chemistry and Technology, vol. 54, pp. 576-595 (1981).

* cited by examiner

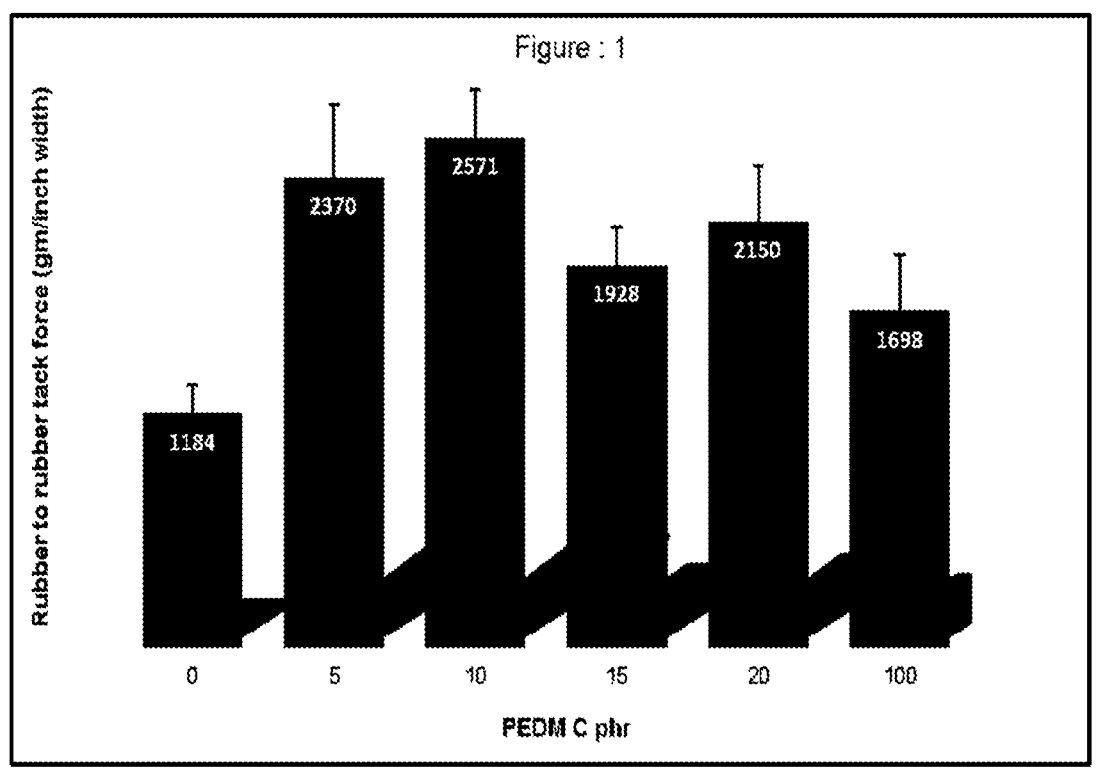

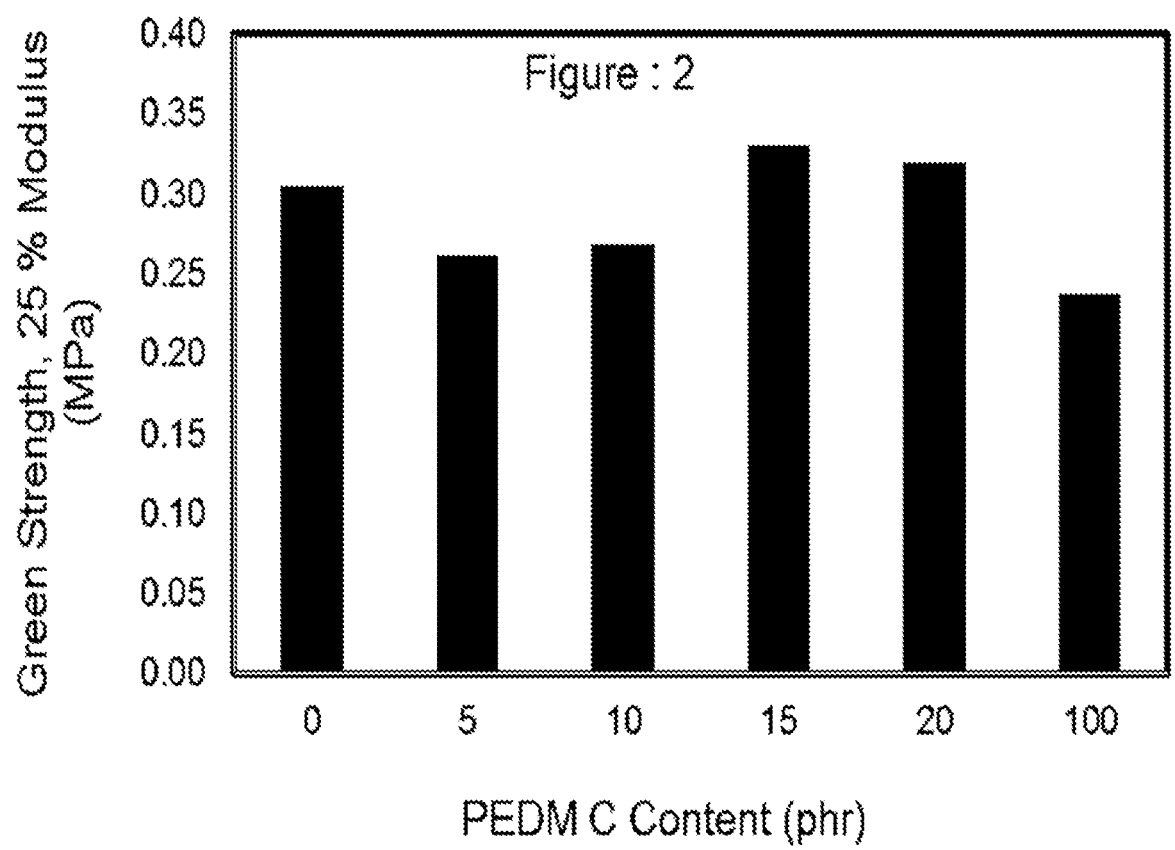

ELASTOMERIC TERPOLYMER COMPOSITIONS FOR CORNER MOLDING APPLICATIONS

CROSS-REFERENCE OF RELATED APPLICATIONS

This application is a National Phase Application claiming priority to PCT Application Serial No. PCT/US2018/059159, filed Nov. 5, 2018, which claims the benefit of priority from U.S. Provisional Application No. 62/596,266, filed Dec. 8, 2017, and the disclosures of which are incorporated herein by reference in their entirety.

FIELD

The present disclosure relates to polymer compositions comprising propylene-α-olefin-diene terpolymers, for instance propylene-ethylene-diene (PEDM) terpolymers, and corning molding articles made thereof.

BACKGROUND

EP(D)M polymers are increasingly used in corner molding applications. Dense corner molding compounds, typically in the hardness range of 65 to 80 Shore A, are used in glass run channels. Low compound viscosity, fast cure in rubber injection molding process, and good adhesion to EP(D)M profiles are some of the desirable attributes for these applications. There is a need for further enhancement of these properties in compounds containing the EP(D)M polymer. Adhesion or tack can be targeted by engineering the polymer through lowering the ethylene content and thereby reducing crystallinity. However, lower crystallinity compromises another important property: green strength. By synthesizing the EP(D)M in multiple reactors, through either series or parallel configuration, the polymer can be designed to balance both tack and green strength. U.S. Pat. Nos. 5,654,370 and 5,571,868 describe elastomeric articles which contain EP(D)M elastomers that provide a surprising improvement in the combination of both peel adhesion and tack and green strength in calendared goods. However, this approach may not be suitable for rubber injection molding applications.

Hydrocarbon tackifiers, such as Escorez™ resins have been used as additives to improve the green tack of EP(D)M formulations. The cure properties of the formulation can be significantly affected by adding a hydrocarbon tackifier. For example, non-hydrogenated tackifiers co-vulcanize with EP(D)M, but do not display long-term heat resistance because these tackifiers are unsaturated. Hydrogenated tackifiers are expensive but show better thermal stability.

Accordingly, there is a need for a polymer based solution to further enhance tack without significantly affecting cure and physical properties. Some potentially relevant background references include: U.S. Pat. Nos. 5,654,370; 5,571,868; 7,199,189; U.S. Patent Publication Nos. 2013/050488; 2017/0233513; U.S. Patent Application Ser. No. 62/485,649; as well as J. R. Beatty, *Rubber Chem. & Tech.*, 42, 1041 (1969) and G. R. Hamed, *Rubber Chem. & Tech.*, 54, 578 (1981).

SUMMARY

Disclosed herein is a composition comprising from 5 to 20 parts by weight per hundred parts by weight rubber (phr) of a propylene-α-olefin-diene (PEDM) terpolymer comprising 1 to 10 wt % diene, 5 to 40 wt % α-olefin, and 15 to 85 wt % propylene, said wt % based on the weight of the PEDM terpolymer; and from 80 to 95 phr of an ethylene-based copolymer comprising ethylene, one or more $C_3$ to $C_{12}$ α-olefins, and, optionally, one or more dienes; wherein the amount of ethylene content of the ethylene-based copolymer (in wt % on the basis of total weight of the ethylene-based copolymer) is greater than the amount of α-olefin content of the PEDM terpolymer (in wt % on the basis of total weight of the PEDM terpolymer).

BRIEF DESCRIPTION OF THE FIGURES

FIG. 1 shows the rubber-to-rubber tack force as a function of PEDM content of corning molding applications.

FIG. 2 shows green strength as a function of PEDM content of corning molding applications.

DETAILED DESCRIPTION

Propylene ethylene copolymers are available under the trade name Vistamaxx™ propylene-based polymers. These polymers are low in ethylene content (typically in the range of 4.5 wt % to 17 wt %) and have isotactic propylene crystallinity. The crystallinity in the polymer decreases with increasing ethylene content. Propylene ethylene co and ter polymers can also be synthesized with an alternate catalyst that does not produce the stereo-specific structures. Such polymers will be essentially amorphous across a wide range of ethylene content. The PEDM polymers described in this study are synthesized with 1, 1'-bis(4-triethylsilylphenyl)methylene-(cyclopentadienyl)(2,7-di-tertiary-butyl-9-fluorenyl)hafnium dimethyl. The ethylene content of the inventive PEDM polymers is from 5 wt % to 35 wt %. In addition the polymers contain a low level of unsaturation through the incorporation of ethylidene norbornene (ENB).

In this invention, elastomeric formulations suitable for corner molding applications are formulated using Vistalon™7602 as the comparative polymer. Typical compounds contain about 32 wt % polymer, a polymer to oil ratio of 1.33, and are sulfur cured. In this invention, a PEDM polymer of 15 wt % ethylene content, low ENB (2.7 wt %), and a low melt flow rate of 7.5 g/10 min was selected as the additive polymer. A portion of the EP(D)M was replaced with the PEDM polymer at levels ranging from 5 phr to 20 phr. Compound green properties, rubber-to-rubber tack, cure, tensile and tear properties were measured. As indicated in the examples of the invention, the formulations containing the PEDM polymer show consistently higher tack, as compared to the control formulation containing Vistalon™ 7602.

Definitions

As used herein, the term "copolymer" is meant to include polymers having two or more monomers. The term "polymer" as used herein includes, but is not limited to, homopolymers, copolymers, terpolymers, etc., and alloys and blends thereof. The term "polymer" as used herein also includes impact, block, graft, random, and alternating copolymers. The term "polymer" shall further include all possible geometrical configurations unless otherwise specifically stated. Such configurations may include isotactic, syndiotactic and random (i.e., atactic) symmetries.

The term "blend" as used herein refers to a mixture of two or more polymers.

The term "monomer" or "comonomer," as used herein, can refer to the monomer used to form the polymer, i.e., the unreacted chemical compound in the form prior to polymerization, and can also refer to the monomer after it has been incorporated into the polymer, also referred to herein as a "[monomer]-derived unit". Different monomers are discussed herein, including propylene monomers, ethylene monomers, and diene monomers.

As used herein, the term "ethylene-based copolymer," includes copolymers derived from ethylene, an α-olefin having 3 or more carbon atoms, such as 3-12 carbon atoms, such as 6-10 carbon atoms, and optionally a diene. In preferred embodiments, the ethylene-based copolymer is an ethylene-propylene copolymer or ethylene-propylene-diene polymer.

As used herein, an "ethylene-propylene-diene polymer" (EP(D)M) is defined to be a copolymer having an ethylene content (derived from ethylene monomers) and a propylene content (derived from propylene monomers), and optionally a diene content (derived from diene monomers, preferably non-conjugated diene monomers), where the ethylene content is from 40 wt % to 95 wt % (such as 41 wt % to 95 wt %, such as 45 wt % to 90 wt %, such as 50 wt % to 80 wt %), the diene content is 0 wt % to 15 wt %, and the balance (i.e., the remaining wt % of the polymer) is primarily (e.g., allowing for minor impurities) or entirely propylene content, based on the weight of the polymer. An EP(D)M may have a Mooney viscosity, (ML, 1+4 @ 125° C.) (measured according to ASTM D1646) of 15 to 100. The terms "EP(D)M" and "EPDM" are used interchangeably and have the same meaning, unless specified otherwise in context (e.g., where the polymer is referred to as definitively comprising diene monomer(s)).

The term "propylene-α-olefin-diene terpolymer" as used herein includes a polymer derived from propylene, an α-olefin (preferably ethylene), and diene monomers. As noted previously, propylene-α-olefin-diene terpolymers may be referred to by the shorthand PEDM, even though α-olefins instead of or in addition to ethylene are contemplated as comonomers in such terpolymers, and/or polyenes instead of or in addition to dienes are contemplated. Preferably, the PEDM terpolymer comprises a propylene content (derived from propylene monomers), an ethylene content (derived from ethylene monomers) and a diene content (derived from diene monomers). PEDMs have an ethylene content from 8 wt % to 45 wt % based on the weight of the polymer, such as from 12 wt % to 40 wt %.

As used herein, "phr" means parts per hundred parts rubber, where the "rubber" is the total rubber content of the composition. Herein, both PEDM and ethylene-based copolymer (e.g., EP(D)M) are considered to contribute to the total rubber content, such that in compositions where both are present, the "total rubber" is the combined weight of PEDM and ethylene-based copolymer. Thus, for example, a composition having 30 parts by weight of PEDM and 70 parts by weight of ethylene-based copolymer may be referred to as having 30 phr PEDM and 70 phr ethylene-based copolymer. Other components added to the composition are calculated on a phr basis—that is, addition of 50 phr of oil means, e.g., that 50 g of oil are present in the composition for every 100 g of PEDM and ethylene-based copolymer combined. Unless specified otherwise, phr should be taken as phr on a weight basis.

As used herein, "tensile strength" means the amount of stress applied to a sample to break the sample. It can be expressed in Pascals or pounds per square inch (PSI). ASTM D412-16 can be used to determine tensile strength of a polymer.

"Mooney viscosity" as used herein is the Mooney viscosity of a polymer or polymer composition. The polymer composition analyzed for determining Mooney viscosity should be substantially devoid of solvent. For instance, the sample may be placed on a boiling-water steam table in a hood to evaporate a large fraction of the solvent and unreacted monomers, and then, dried in a vacuum oven overnight (12 hours, 90° C.) prior to testing, in accordance with laboratory analysis techniques, or the sample for testing may be taken from a devolatilized polymer (i.e., the polymer post-devolatilization in industrial-scale processes). Unless otherwise indicated, Mooney viscosity is measured using a Mooney viscometer according to ASTM D-1646, but with the following modifications/clarifications of that procedure. First, sample polymer is pressed between two hot plates of a compression press prior to testing. The plate temperature is 125° C.+/−10° C. instead of the 50+/−5° C. recommended in ASTM D-1646, because 50° C. is unable to cause sufficient massing. Further, although ASTM D-1646 allows for several options for die protection, should any two options provide conflicting results, PET 36 micron should be used as the die protection. Further, ASTM D-1646 does not indicate a sample weight in Section 8; thus, to the extent results may vary based upon sample weight, Mooney viscosity determined using a sample weight of 21.5+/−2.7 g in the ASTM D-1646 Section 8 procedures will govern. Finally, the rest procedures before testing set forth in D1646 Section 8 are 23+/−3° C. for 30 min in air; Mooney values as reported herein were determined after resting at 24+/−3° C. for 30 min in air. Samples are placed on either side of a rotor according to the ASTM D-1646 test method; torque required to turn the viscometer motor at 2 rpm is measured by a transducer for determining the Mooney viscosity. The results are reported as Mooney Units (ML, 1+4 @ 125° C.), where M is the Mooney viscosity number, L denotes large rotor (defined as ML in ASTM D1646-99), 1 is the pre-heat time in minutes, 4 is the sample run time in minutes after the motor starts, and 125° C. is the test temperature. Thus, a Mooney viscosity of 90 determined by the aforementioned method would be reported as a Mooney viscosity of 90 MU (ML, 1+4 @ 125° C.). Alternatively, the Mooney viscosity may be reported as 90 MU; in such instance, it should be assumed that the just-described method is used to determine such viscosity, unless otherwise noted. In some instances, a lower test temperature may be used (e.g., 100° C.), in which case Mooney is reported as Mooney Viscosity (ML, 1+4 @ 100° C.), or @ T° C. where T is the test temperature.

Numerical ranges used herein include the numbers recited in the range. For example, the numerical range "from 1 wt % to 10 wt %" includes 1 wt % and 10 wt % within the recited range.

Compositions

Compositions of the present disclosure comprise a minor amount (e.g., from 5 phr to 20 phr of a composition) of a first polymer that is a random PEDM terpolymer and a major amount (e.g., from 80 phr to 95 phr of a composition) of a second polymer that is a random ethylene-based copolymer.

First Polymers: PEDM Terpolymers

PEDM terpolymers of the present disclosure have from 1 to 10 wt % polyene (preferably diene) content, 15 to 40 wt % $C_2$ or $C_4$ to $C_{12}$ α-olefin (preferably ethylene) content, and 15 to 85 wt % propylene content, said wt % s based on the weight of the PEDM terpolymer.

PEDM terpolymers of the present disclosure comprise from 8 wt % to 40 wt % $C_2$ or $C_4$ to $C_{12}$ α-olefin comonomer (preferably ethylene), based on the weight of the PEDM terpolymer. Other preferred ranges of α-olefin (such as ethylene) content include from 12 wt % to 40 wt %, such as from 25 wt % to 40 wt %, such as from 27 wt % to 40 wt %, such as from 30 wt % to 40 wt %, such as from 30 wt % to 38 wt %, such as from 30 wt % to 34 wt %, such as from 32 wt % to 38 wt %, such as from 34 wt % to 38 wt %, for example about 35 wt %, based on the weight of the PEDM terpolymer. In yet other embodiments, the α-olefin (preferably ethylene) content may be within the lower range from 12 to 30 wt %, such as from 13 to 25 wt % or even 13 to 20 wt %, based on the weight of the PEDM terpolymers.

The polyenes, as noted, are preferably (but not necessarily) dienes. Suitable dienes may be conjugated or non-conjugated. Preferably, the dienes are non-conjugated. Dienes include 5-ethylidene-2-norbornene (ENB); 1,4-hexadiene; 5-methylene-2-norbornene (MNB); 1,6-octadiene; 5-methyl-1,4-hexadiene; 3,7-dimethyl-1,6-octadiene; 1,3-cyclopentadiene; 1,4-cyclohexadiene; vinyl norbornene (VNB); dicyclopendadiene (DCPD); and combinations thereof. Preferably, the diene is ENB or VNB.

Preferably, a PEDM terpolymer comprises a diene content of from 0.2 wt % to 10 wt %, such as from 0.5 wt % to 8 wt %, such as from 0.8 wt % to 6 wt %, such as from 1 wt % to 5 wt %, such as from 2 wt % to 4 wt %, for example about 3 wt %, based on the weight of the terpolymer. Other preferred ranges may include from 0.2 wt % to 5 wt %, such as from 0.2 wt % to 4 wt %, such as from 0.2 wt % to 3.5 wt %, such as from 0.2 wt % to 3.0 wt %, such as from 0.2 wt % to 2.5 wt %, based on the weight of the polymer. In at least one embodiment, the diene is 5-ethylidene-2-norbornene content in an amount of from 0.5 wt % to 10 wt %, such as from 0.5 wt % to 4 wt %, such as from 1 wt % to 3.5 wt %, such as from 0.5 wt % to 3.0 wt %, for example about 3 wt % based on the weight of the polymer.

PEDM terpolymers of the present disclosure may have a weight average molecular weight (Mw) of 5,000,000 or less, a number average molecular weight (Mn) of 3,000,000 or less, a z-average molecular weight (Mz) of 10,000,000 or less.

Molecular weights (number average molecular weight (Mn), weight average molecular weight (Mw), and z-average molecular weight (Mz)) were determined using a Polymer Laboratories Model 220 high temperature gel-permeation chromatography size-exclusion chromatography (GPC-SEC) equipped with on-line differential refractive index (DRI), light scattering (LS), and viscometer (VIS) detectors. Three Polymer Laboratories PLgel 10 m Mixed-B columns were used for separation using a flow rate of 0.54 ml/min and a nominal injection volume of 300 μL. The columns were calibrated with polystyrene standard. The detectors and columns were contained in an oven maintained at 135° C. The stream emerging from the SEC columns was directed into the miniDAWN (Wyatt Technology, Inc.) optical flow cell and then into the DRI detector. The viscometer was inside the SEC oven, positioned after the DRI detector. The details of these detectors as well as their calibrations have been described by, for example, T. Sun, P. Brant, R. R. Chance, and W. W. Graessley, *Macromolecules*, vol. 34(19), pp. 6812-6820, (2001).

Solvent for the SEC experiment was prepared by dissolving 6 grams of butylated hydroxy toluene (BHT) as an antioxidant in 4 liters of Aldrich reagent grade 1, 2, 4-trichlorobenzene (TCB). The TCB mixture was then filtered through a 0.7 micrometer glass pre-filter and subsequently through a 0.1 micrometer Teflon filter. The TCB was then degassed with an online degasser before entering the SEC. Polymer solutions were prepared by placing dry polymer in a glass container, adding the desired amount of BHT stabilized TCB, then heating the mixture at 160° C. with continuous agitation for about 2 hours. All quantities were measured gravimetrically. The TCB densities used to express the polymer concentration in mass/volume units are 1.463 g/mL at 22° C. and 1.324 g/mL at 135° C. The injection concentration was from 1.0 to 2.0 mg/mL, with lower concentrations being used for higher molecular weight samples. Prior to running each sample the DRI detector and the injector were purged. Flow rate in the apparatus was then increased to 0.5 mL/minute, and the DRI is allowed to stabilize for 8 to 9 hours before injecting the first sample. The concentration, c, at each point in the chromatogram is calculated from the baseline-subtracted DRI signal, $I_{DRI}$, using the following equation:

$$c = K_{DRI} I_{DRI}/(dn/dc)$$

where $K_{DRI}$ is a constant determined by calibrating the DRI with a series of mono-dispersed polystyrene standards with molecular weight ranging from 600 to 10M, and (dn/dc) is the refractive index increment for the system. The refractive index, n=1.500 for TCB at 145° C. and λ=690 nm. For purposes of this invention and the claims thereto (dn/dc) =0.1048 for ethylene-propylene copolymers, and (dn/dc) =0.01048−0.0016ENB for EPDM comprising ENB as the diene, where ENB is the ENB content in wt % in the ethylene-propylene-diene terpolymer. Where other non-conjugated polyenes are used instead of (or in addition to) ENB, the ENB is taken as weight percent of total non-conjugated polyenes. The value (dn/dc) is otherwise taken as 0.1 for other polymers and copolymers, including PEDM terpolymers. Units of parameters used throughout this description of the SEC method are: concentration is expressed in g/cm³, molecular weight is expressed in g/mol, and intrinsic viscosity is expressed in dL/g.

The light scattering (LS) detector was a high temperature miniDAWN (Wyatt Technology, Inc.). The primary components are an optical flow cell, a 30 mW, 690 nm laser diode light source, and an array of three photodiodes placed at collection angles of 45°, 90°, and 135°. The molecular weight, M, at each point in the chromatogram was determined by analyzing the LS output using the Zimm model for static light scattering (M. B. Huglin, LIGHT SCATTERING FROM POLYMER SOLUTIONS, Academic Press, 1971):

$$\frac{K_o c}{\Delta R(\theta)} = \frac{1}{MP(\theta)} + 2A_2 c$$

Here, $\Delta R(\theta)$ is the measured excess Rayleigh scattering intensity at scattering angle θ, c is the polymer concentration determined from the DRI analysis, $A_2$ is the second virial coefficient (for purposes of this invention, $A_2$=0.0015 for ethylene homopolymer and $A_2$=0.0015−0.00001 EE for ethylene-propylene copolymers, where EE is the ethylene content in weight percent in the ethylene-propylene copolymer. $P(\theta)$ is the form factor for a mono-disperse random coil, and $K_o$ is the optical constant for the system:

$$K_o = \frac{4\pi^2 n^2 (dn/dc)^2}{\lambda^4 N_A}$$

where $N_A$ is Avogadro's number, and (dn/dc) is the refractive index increment for the system. The refractive index, n=1.500 for TCB at 145° C. and λ=690 nm.

PEDM terpolymers of the present disclosure may have an Mw of from 5,000 g/mol to 5,000,000 g/mol, such as from 10,000 g/mol to 1,000,000 g/mol, such as from 20,000 g/mol to 500,000 g/mol, such as from 50,000 g/mol to 400,000 g/mol. The PEDM terpolymer may have an Mn of 2,500 g/mol to 2,500,000 g/mol, such as from 5,000 g/mol to 500,000 g/mol, such as from 10,000 g/mol to 250,000 g/mol, such as from 25,000 g/mol to 200,000 g/mol. The PEDM terpolymer may have an Mz of 10,000 g/mol to 7,000,000 g/mol, such as from 50,000 g/mol to 1,000,000 g/mol, such as from 80,000 g/mol to 700,000 g/mol, such as from 100,000 g/mol to 500,000 g/mol. For purposes of this application, where DRI and LS measurements conflict, LS measurements should be used for Mw and Mz, while DRI measurements should be used for Mn.

The molecular weight distribution index (MWD=(Mw/Mn)) of PEDM terpolymers of the present disclosure may be from 1.5 to 40. For example, a PEDM terpolymer may have an MWD from 1.5 to 40, such as from 1.8 to 20, such as from 2.0 to 10, such as from 2.0 to 5, such as from 3 to 4.5. In one or more embodiments, the MWD of a PEDM terpolymer is 1.8 to 5, such as from 1.8 to 3. Further, although MWD (polydispersity) is taken as Mw/Mn, where DRI and LS measurements conflict, MWD should be determined as Mw (measured by LS)/Mn (measured by DRI), or $Mw_{LS}/Mn_{DRI}$.

PEDM terpolymers of the present disclosure may have a density of from 0.85 g/cm$^3$ to 0.92 g/cm$^3$, or from 0.87 g/cm$^3$ to 0.90 g/cm$^3$, or from 0.88 g/cm$^3$ to 0.89 g/cm$^3$, at room temperature as measured per the ASTM D-1505 test method.

PEDM terpolymers of the present disclosure may have a melt flow rate (MFR, 2.16 kg weight at 230° C.), equal to or greater than 0.2 g/10 min as measured according to the ASTM D-1238. In at least one aspect, the MFR (2.16 kg at 230° C.) is from 0.5 g/10 min to 200 g/10 min, such as from 1 g/10 min to 100 g/10 min, such as from 2 g/10 min to 30 g/10 min, such as from 5 g/10 min to 30 g/10 min, such as from 10 g/10 min to 30 g/10 min, such as from 10 g/10 min to 25 g/10 min. In at least one aspect, MFR (2.16 kg at 230° C.) is about 7.5 g/10 min.

PEDM terpolymers of the present disclosure may have a Mooney viscosity (ML, 1+4 @ 125° C.) of less than 100, such as less than 75, such as less than 60, such as less than 30, such as less than 20, such as less than 15, for example about 14 MU. For instance, in PEDM according to some embodiments, Mooney viscosity may be within the range from 5, 10, or 12 MU to 20, 25, or 30 MU.

PEDM terpolymers of the present disclosure preferably have atactic polypropylene sequences. Also or instead, they are preferably amorphous, meaning they will exhibit no melting peak when subjected to differential scanning calorimetry (DSC) testing. Alternatively, PEDM according to some embodiments may exhibit minor melting peak, such that they may be observed to have Hf<1 J/g according to the DSC methodology described herein. Further, where a PEDM exhibits any melting peak, such peak may be a single peak, or the PEDM may show secondary melting peaks adjacent to the principal peak. For purposes herein, such secondary melting peaks are considered together as a single melting point, with the highest of these peaks (relative to baseline as described herein) being considered as the melting point of the PEDM terpolymer.

According to yet further embodiments, the crystallinity of PEDM terpolymers may be expressed in terms of percentage of crystallinity (i.e., % crystallinity), as determined according to the DSC procedure described herein. Although PEDM according to certain embodiments is amorphous (and may therefore be said to have 0% crystallinity), if a PEDM according to various other embodiments exhibits any crystallinity, it preferably has a % crystallinity of from 0.1% to 5%, preferably 0.1% to 3%. (The degree of crystallinity is determined by dividing (i) heat of fusion measured by (ii) the heat of fusion for 100% crystalline polyethylene, which has the value of 293 J/g (B. Wunderlich, Thermal Analysis, Academic Press, 1990, pp. 417-431).)

The DSC procedures for determining glass transition temperature (Tg), melting point (Tm), and/or heat of fusion (Hf) (or lack thereof) of the PEDM terpolymer include the following. The polymer is pressed at a temperature of from 200° C. to 230° C. in a heated press, and the resulting polymer sheet is hung, under ambient conditions (of 20-23.5° C.), in the air to cool. 6 to 10 mg of the polymer sheet is removed with a punch die. This 6 to 10 mg sample is annealed at room temperature (22° C.) for 80 to 100 hours. At the end of this period, the sample is placed in a DSC (Perkin Elmer Pyris One Thermal Analysis System) and cooled at a rate of about 10° C./min to –30° C. to –50° C. and held for 10 minutes at –50° C. The sample is heated at 10° C./min to attain a final temperature of 200° C. The sample is kept at 200° C. for 5 minutes. Then a second cool-heat cycle is performed, using the same conditions described above. Events from both cycles, "first melt" and "second melt", respectively, are recorded. The thermal output is recorded as the area under the melting peak of the sample, which typically occurs between 0° C. and 200° C. It is measured in Joules and is a measure of the Hf of the polymer. Reference to melting point temperature and Hf herein refers to the first melt.

Further, as mentioned above, where the sample exhibits no melting peak, as in the case of amorphous polymers, it may be said to have no Hf. However, even some amorphous or near-amorphous PEDM samples might exhibit a minor melting peak, e.g., such that Hf on the first melt may be observed as <1 J/g. Therefore, for purposes of the present application, a PEDM may be considered amorphous when it has Hf<1 J/g, or alternatively when it exhibits no discernable melting peak, both observations being taken from a first melt in the above-described DSC procedure.

PEDM terpolymers of some embodiments can have a glass transition temperature (Tg), as determined by the DSC procedure described herein, from –45° C. to –2° C., such as from –40° C. to –25° C., –40° C. to –20° C., –35° C. to –25° C., –40° C. to –15° C., or –35° C. to –15° C.; or alternatively from –20° C. to –2° C., such as from –15° C. to –2° C., such as from –10° C. to –2° C., such as from –5° C. to –2° C.

Catalyst Systems:

PEDM terpolymers of the present disclosure can be synthesized using a catalyst system comprising at least one catalyst and at least one activator.

Catalysts: PEDM terpolymers of the present disclosure can be synthesized using any suitable metallocene catalyst system, although it is preferred that the catalyst system be such that the PEDM terpolymers has atactic polypropylene sequences and/or little or no crystallinity. Suitable metallocene catalyst systems include a catalyst that is a bridged fluorenyl-cyclopentadienyl group 4 catalyst (and/or Cp-fluorenyl variants), mono-Cp amido group 4 catalyst (and/or mono-Cp amido variants), biphenyl phenol (BPP) transition metal catalyst, pyridyl amide transition metal catalyst and/or pyridyl diamide transition metal catalyst.

Particularly preferred metallocene catalysts according to some embodiments include fluorenyl-cyclopentadienyl group 4 catalysts represented by formula (I):

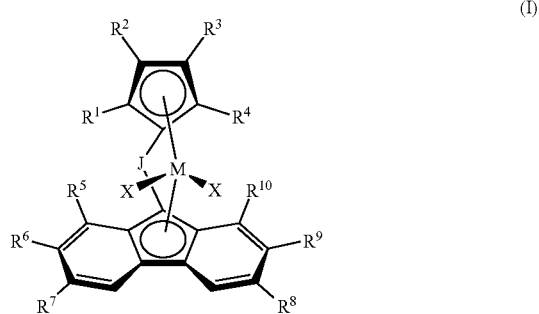

where: J is a divalent bridging group (preferably comprising C, Si, or both);

M is a group 4 transition metal (with Hf being preferred in certain embodiments);

each X is independently a univalent anionic ligand, or two Xs are joined together to form a metallocycle ring with M, or two Xs are joined to form a chelating ligand, a diene ligand, or an alkylidene ligand; and each $R^1$, $R^2$, $R^3$, $R^4$, $R^5$, $R^6$, $R^7$, $R^8$, $R^9$, and $R^{10}$ is independently hydrogen, $C_1$ to $C_{50}$ substituted or unsubstituted alkyl (preferably unsubstituted $C_1$ to $C_{10}$ alkyl, more preferably $C_1$ to $C_5$ alkyl), provided that any one or more of the pairs $R^1$ and $R^2$, $R^3$ and $R^4$, $R^5$ and $R^6$, $R^6$ and $R^7$, $R^8$ and $R^9$, and $R^9$ and $R^{10}$, may optionally be bonded together to form a saturated or partially saturated cyclic or fused ring structure. Both the activated and un-activated (precursor) forms of the compound represented by formula (I) are embraced by formula (I).

In at least one embodiment, J is a bridging group comprising carbon and/or silicon atoms, such as dialkylsilyl; preferably J is selected from $-CH_2-$, $-CH_2CH_2-$, $-C(CH_3)_2-$, $-SiMe_2-$, $-SiEt_2-$, $-SiPh_2-$, $-Si(Me)(C_6H_5)-$, $-C(Ph)_2-$, $-C(p-(Et)_3SiPh)_2-$, $-C(Si(Et)_3)_2-$, $(CH_2)_3Si=$, $(CH_2)_4Si=$, and $(CH_2)_5Si=$, where Me is methyl, Et is ethyl, and Ph is phenyl, and further where each $(CH_2)_xSi=$ indicates a cyclic silylene moiety having x carbons and the silicon atom in the cyclic group, e.g., where x is 4 in such compounds, J is cyclotetramethylenesilylene.

In at least one embodiment, $R^6$ and $R^9$ are each $C_1$ to $C_4$ alkyl, preferably $C_4$ alkyl such as tert-butyl; $R^1$-$R^4$, $R^5$, $R^7$, $R^8$, and $R^{10}$ are each independently methyl, ethyl, or H (preferably, each is H); J is selected from any of the groups described above (preferably J is $(p-(Et)_3SiPh)_2C$); M is Hf; and each X is independently $C_1$ to $C_3$ alkyl or a halide (preferably each X is methyl).

A particularly preferred fluorenyl-cyclopentadienyl group 4 catalyst according to some embodiments is 1,1'-bis(4-triethylsilylphenyl)methylene-(cyclopentadienyl)(2,7-di-tertiary-butyl-fluoren-9-yl)hafnium dimethyl.

Activators: The terms "cocatalyst" and "activator" can be used interchangeably and include any compound which can activate any one of the catalyst compounds described above (including either or both of the first and second metallocene catalyst compounds) by converting the neutral catalyst compound ("un-activated") to a catalytically active catalyst compound cation ("activated"). Suitable activators are described in Paragraphs [0110] to [0115] of WIPO Publication No. WO 2016/114914 A1, which description is herein incorporated by reference; and/or in Paragraphs [0110] to [0133] of U.S. Patent Publication No. 2015/0025209, which description is incorporated by reference herein.

Particularly useful activators in some embodiments of the present disclosure include non-coordinating anion (NCA) activators, such as those in Paragraph [0124] of U.S. Patent Publication No. 2015/0025209, and also those in Columns 7 and 20-21 in U.S. Pat. No. 8,658,556, which description is incorporated by reference. Particular examples of suitable NCA activators include: N,N-dimethylanilinium tetrakis (pentafluorophenyl)borate, N,N-dimethylanilinium tetrakis (perfluoronaphthyl)borate, N,N-dimethylanilinium tetrakis (perfluorobiphenyl)borate, triphenylcarbenium tetrakis(perfluoronaphthyl)borate, bis($C_4$-$C_{20}$alkyl)methylammonium tetrakis (perfluoronaphthyl)borate, $Me_3NH^+$ tetrakis(pentafluorophenyl)borate, $Me_3NH^+$ tetrakis(heptafluoro-2-naphthyl)borate, and bis(hydrogenated tallowalkyl)methylammonium tetrakis(pentafluorophenyl)borate. A particularly preferable NCA activator is N,N-dimethylanilinium tetrakis(pentafluorophenyl)borate.

A catalyst of the present disclosure can be activated on-line in the catalyst feed line or in the polymerization reactor. Furthermore, an activator-to-catalyst molar ratio is from 0.1:1 to 1000:1, such as from 0.5:1 to 100:1, such as 2:1 to 50:1. A preferred molar ratio is 1:1.

In some embodiments, the activator(s) is/are contacted with a catalyst compound to form the catalyst system comprising activated catalyst and activator and/or other charge-balancing moiety, before the catalyst system is contacted with one or more monomers to form an PEDM terpolymer. In other embodiments, the activator may be co-fed together with one or more monomers into a reactor having catalyst in the reactor. Preferably, the catalyst is contacted with the activator before being fed into the polymerization reaction zone of a reactor.

Second Polymers

Compositions of the present disclosure comprise a second polymer different than the PEDM terpolymer described above. The second polymer is preferably an ethylene-based copolymer. In at least one embodiment, a composition comprises a blend of the PEDM terpolymer and one or more ethylene-based copolymer(s).

Compositions of the present disclosure may comprise one or more second polymers (ethylene-based copolymers) in an amount from about 50 phr to about 99 phr, such as from about 60 phr to about 99 phr, such as from about 70 phr to about 98 phr, such as from about 70 phr to about 95 phr, such as from about 75 phr to about 95 phr, such as from about 85 phr to about 95 phr, where the basis of 100 parts rubber is taken as the combined weight of first polymer (e.g., PEDM) and second polymer (e.g., ethylene-based copolymer) in the composition.

Ethylene-based copolymers of the present disclosure comprise an ethylene content different than the ethylene content of the first polymer. In at least one embodiment, an ethylene-based copolymer has at least 40 wt % ethylene content, preferably at least 50, 55, 60, 65, 70 or 75 wt % ethylene content, and at most 99 wt % ethylene content, such as at most 95, 90, 85, 80, 75, or 70 wt % in various embodiments (again based on the weight of the ethylene-based copolymer). Ethylene-based copolymers of the present disclosure further comprise a $C_3$ to $C_{12}$ α-olefin content and, optionally, a polyene (preferably diene) content comprising one or more polyenes (preferably one or more dienes). $C_3$ to $C_{12}$ α-olefins include propylene, butylene, pentylene, hexylene, heptylene, octylene, nonylene, decylene, undecylene, dodecylene, and branched isomers thereof. Propylene is particularly preferred according to some embodiments (e.g., such that the ethylene-based copolymer may be an EP(D)M copolymer), while butylene (1-butene) is preferred in yet other embodiments (e.g., such that the ethylene-based copolymer may be an EB(D)M copolymer).

With respect to the polyenes, any polyene suitable in the PEDM is suitable for inclusion in the ethylene-based copolymer, with VNB or ENB, and in particular ENB, preferred. According to yet other embodiments, suitable polyenes may include conjugated dienes. Conjugated dienes include 1,3-butadiene, 2-methyl-1,3-butadiene, 2,3-di($C_1$-$C_5$ alkyl)-1,3-butadienes, such as, for example, 2,3-dimethyl-1,3-butadiene, 2,3-diethyl-1,3-butadiene, 2-methyl-3-ethyl-1,3-butadiene or 2-methyl-3-isopropyl-1,3-butadiene, an aryl-1,3-butadiene, 1,3-pentadiene or 2,4-hexadiene. Dienes also include vinylaromatic compounds: styrene, ortho-, meta- or para-methylstyrene, the "vinyltoluene" commercial mixture, para-(tert-butyl)styrene, methoxystyrenes, chlorostyrenes, vinylmesitylene, divinylbenzene or vinylnaphthalene. Ethylene-based copolymers of various embodiments preferably have 0 to 20 wt % polyene content, such as 0 to 15 wt %, preferably 1 to 10 wt %, 2 to 9 wt %, or 3 to 7 wt %, with ranges from any of the foregoing low ends to any of the foregoing high ends also contemplated in various embodiments.

Further, in certain embodiments, ethylene-based copolymers of the present disclosure can have isotactic polypropylene content.

According to some embodiments, the ethylene-based copolymer exhibits more crystallinity than the PEDM; for instance, it may have Hf>1 J/g. According to yet further embodiments, crystallinity of ethylene-based copolymers of the present disclosure may be expressed in terms of percentage of crystallinity (i.e., % crystallinity), as determined according to the DSC procedure described herein. An ethylene-based copolymer may have a % crystallinity of from 5% to 80%, such as from 10% to 60%, such as from 20% to 40%. (The degree of crystallinity is determined by dividing heat of fusion measured with the heat of fusion for 100% crystalline polyethylene which has the value of 293 J/g (B. Wunderlich, Thermal Analysis, Academic Press, 1990, pp. 417-431).)

An ethylene-based copolymer may be an ethylene-propylene copolymer and in particular an EP(D)M terpolymer (such as Vistalon™ 706, Tafmer™, or Versify™) or an EB(D)M terpolymer. Ethylene-based copolymers of the present disclosure can have a weight average molecular weight ($M_w$) from 10,000 g/mol to 400,000 g/mol, such as 100,000 g/mol to 200,000. They may also or instead have a melting point (DSC) of less than 110° C., such as less than 100° C.

Compositions described herein can comprise a single ethylene-based copolymer or a mixture of several ethylene-based copolymers, it being possible for the ethylene-based copolymers to be used in combination with any type of synthetic elastomer other than an ethylene-based copolymer, indeed even with polymers other than elastomers, for example thermoplastic polymers.

In at least one embodiment, the second polymer (ethylene-based copolymer) is a polyethylene-polybutadiene block-copolymer, wherein the polyethylene-polybutadiene block-copolymer is a block copolymer having the general formula: PE-XL-fPB; where "PE" is a polyethylene block having a weight average molecular weight within the range from 1,000 to 150,000 g/mol, the "fPB" is a functionalized polar polybutadiene block having a weight average molecular weight from 500 g/mol to 30,000 g/mol, and "XL" is a cross-linking moiety that covalently links the PE and fPB blocks; and wherein the Maximum Energy Loss (Tangent Delta) of the immiscible polyolefin domain is a temperature within the range from −30° C. to 10° C.

In at least one embodiment, compositions of the present disclosure comprise 15 wt % to 60 wt % of a styrenic copolymer; 1 wt % to 60 wt % of a polybutadiene polymer; 1 wt % to 60 wt % of natural rubber or synthetic polyisoprene; 15 wt % to 60 wt % of a functionalized styrenic copolymer; 1 wt % to 60 wt % of a functionalized polar polybutadiene polymer; or 1 wt % to 60 wt % of natural rubber or functionalized synthetic polyisoprene.

Polymer Blending

Compositions of the present disclosure may be formed by combining the first polymer (PEDM) and the second polymer (ethylene-based copolymer) using any suitable method known in the polymer processing art. For example, a composition may be made by blending the first polymer and second polymer in solution and generally removing the blend. This polymer composition has predetermined amounts of the first polymer and second polymer and may be made by independent polymerization of the first and second elastomeric polymeric components. Such individual polymerization may be conducted in series or parallel polymerization reactors or in a single polymerization reactor with at least two different polymerization catalysts. Procedures for the recovery of such a predetermined composition are described in U.S. Pat. No. 4,722,971 which are incorporated herein by reference. The disclosure includes traditional Ziegler-Natta catalyst systems, however metallocene catalyst systems are also contemplated for the present disclosure.

In at least one embodiment, a method for preparing a composition of the first polymer (PEDM) and the second polymer (ethylene-based copolymer) includes contacting in a first reactor a first metallocene catalyst with ethylene, propylene, and a diene to form a first polymer. The first polymer comprises from 1 wt % to 10 wt % diene content, such as from 2 wt % to 4 wt %, based on the total weight of the polymer; from 8 wt % to 45 wt % ethylene content, such as 12 wt % to 40 wt %, (e.g., 30 to 40 wt %, or 12 to 25 wt %), based on the total weight of the polymer; and from 50 wt % to 91 wt %, such as 55 to 85 wt %, atactic propylene content. The method further includes contacting in a second reactor (or the first reactor) a second metallocene catalyst with ethylene and propylene, and optionally a diene, to form a second polymer such as an EP copolymer or EP(D)M terpolymer. Methods can include transferring the first polymer to the second reactor or the second polymer to the first reactor and recovering from the second reactor or the first reactor, respectively, a composition comprising from 1 phr to 20 phr, such as about 5 phr to 30 phr, such as about 5 phr to about 15 phr, of the first polymer and from 70 phr to 99 phr of the second polymer. The recovered polymer composition may then be cross-linked, for example, as described in more detail below.

Alternatively, in at least one embodiment, a blend of first polymer and second polymer may be prepared by combining the first polymer from the first reactor and the second polymer from the second reactor and mixed, for example, in a production extruder, such as the extruder on an injection molding machine or on a continuous extrusion line.

In at least one embodiment, the method of blending the polymers may be to melt-blend the polymers in a batch mixer, such as a Banbury™ or Brabender™ mixer. Blending may include melt blending the first polymer and the second polymer in an extruder, such as a single-screw extruder or a twin-screw extruder. Extrusion technology for polymer blends is well known in the art, and is described in more detail in, for example, *PLASTICS EXTRUSION TECHNOLOGY*, F. Hensen, Ed. (Hanser, 1988), pp. 26-37, and in *POLYPROPYLENE HANDBOOK*, E. P. Moore, Jr. Ed. (Hanser, 1996), pp. 304-348.

The first polymer and the second polymer may also be blended by a combination of methods, such as dry blending followed by melt blending in an extruder, or batch mixing of some components followed by melt blending with other components in an extruder. The first polymer and the second polymer may also be blended using a double-cone blender, ribbon blender, or other suitable blender, or in a Farrel Continuous Mixer (FCM™).

Compositions

Compositions of the present disclosure include and/or are the reaction product of the first polymer and the second polymer (as a polymer blend or otherwise) described above (and in whatever form: pellet, bale, or otherwise). Compositions of the present disclosure may further include and/or be the reaction product of any one or more additives. Additives include curatives, cross-linking agents, fillers, process oils, plasticizers, compatibilizers, cross-linkers, and the like.

In embodiments where curatives, e.g., cross-linking agents or vulcanizing agents, are present in a composition, the polymers of the composition may be present in at least partially cross-linked form (that is, at least a portion of the polymer chains are cross-linked with each other, e.g., as a result of a curing process typical for EP(D)M rubbers). Accordingly, particular embodiments provide for an at least partially cross-linked elastomeric composition made by mixing a composition comprising: (a) a first polymer (PEDM) and a second polymer (ethylene-based copolymer) (which may be mixed in accordance with any of the above-described methods for polymer blends); (b) one or more vulcanization activators; (c) one or more vulcanizing agents; and/or (d) one or more further additives.

Suitable vulcanization activators include zinc oxide, stearic acid, and the like. These activators may be mixed in amounts ranging from 0.1 phr to 20 phr. Different vulcanization activators may be present in different amounts. For instance, where the vulcanization activator includes zinc oxide, the zinc oxide may be present in an amount from 1 phr to 20 phr, such as from 2.5 phr to 10 phr (e.g., about 5 phr), while stearic acid may preferably be employed in amounts ranging from 0.1 phr to 5 phr, such as 0.1 phr to 2 phr (e.g., about 1.5 phr).

Any suitable vulcanizing agent known in the art may be used. Of particular note are curing agents as described in Col. 19, line 35 to Col. 20, line 30 of U.S. Pat. No. 7,915,354, which description is hereby incorporated by reference (e.g., sulfur, peroxide-based curing agents (Vulcup 40 KE available from Arkema of Colombes, France, resin curing agents, silanes, and hydrosilane curing agents). Other examples include phenolic resin curing agents (e.g., as described in U.S. Pat. No. 5,750,625, also incorporated by reference herein). Cure co-agents may also be included (e.g., zinc dimethacrylate (Dymalink 708) or those described in the already-incorporated description of U.S. Pat. No. 7,915, 354).

Further additives may be chosen from any known additives useful for EPDM compositions, and include, among others, one or more of:

Process oil, such as paraffinic and/or isoparaffinic process oil (examples including Sunpar™ 2280 (available from HollyFrontier Refining & Marketing LLC, Tulsa, Okla.); as well as Flexon™ 876, CORE™ 600 base stock oil, Flexon™ 815, and CORE™ 2500 base stock oil, available from ExxonMobil Chemical Company, Baytown, Tex. Particularly in embodiments where color of the end product may be important a white oil (e.g., API Group II or Group III base oil) may be used as process oil. Examples include paraffinic and/or isoparaffinic oils with low (under 1 wt %, preferably under 0.1 wt %) aromatic and heteroatom content. Compositions of the present disclosure may comprise process oil from 1 phr to 150 phr, such as 50 phr to 100 phr, such as 60 phr to 80 phr, or, for sponge grades, from 50 phr to 200 phr, such as 70 phr to 150 phr, such as 80 phr to 100 phr, and preferred process oils have viscosity at 40° C. from 80 CSt to 600 CSt;

Vulcanization accelerators: compositions of the present disclosure can comprise 0.1 phr to 15 phr, such as 1 phr to 5 phr, or 2 phr to 4 phr, with examples including thiazoles such as 2-mercaptobenzothiazole or mercaptobenzothiazyl disulfide (MBTS); guanidines such as diphenylguanidine; sulfenamides such as N-cyclohexylbenzothiazolsulfenamide; dithiocarbamates such as zinc dimethyl dithiocarbamate, zinc diethyl dithiocarbamate, zinc dibenzyl dithiocarbamate (ZBEC); and zinc dibutyldithiocarbamate, thioureas such as 1,3-diethylthiourea, thiophosphates and others;

Processing aids (e.g., polyethylene glycol or zinc soap);

Carbon black (e.g., having particle size from 20 nm to 600 nm and structure having DBPA (dibutyl phthalate absorption number) within the range from 0 to 150, as measured by the DBP method described in ASTM D2414. Compositions of the present disclosure may comprise carbon black from 1 phr to 500 phr, preferably from 1 phr to 200 phr, such as from 50 phr to 150 phr;

Mineral fillers (talc, calcium carbonate, clay, silica, aluminum trihydrate, and the like), which may be present in the composition from 1 phr to 200 phr, preferably from 20 phr to 100 phr, such as from 30 phr to 60 phr;

Where foaming may be desired, sponge or foaming grade additives, such as foaming agent or blowing agent, particularly in very high Mooney viscosity embodiments, such as those suitable for sponge grades. Examples of such agents include: azodicarbonamide (ADC), ortho-benzo sulfonyl hydrazide (OBSH), p-toluenesulfonylhydrazide (TSH), 5-phenyltetrazole (5-PT), and sodium bicarbonate in citric acid. Microcapsules may also or instead be used for such foaming applications. These may include a thermo-expandable microsphere comprising a polymer shell with a propellant contained therein. Examples are known in the art and described in, for example, U.S. Pat. Nos. 6,582,633 and 3,615,972, WIPO Publication Nos. WO 99/46320 and WO 99/43758, and contents of which hereby are incorporated by reference. Examples of such thermo-expandable microspheres include EXPANCEL™ products commercially available from Akzo Nobel N.V., and ADVANCELL™ products available from Sekisui. In other embodiments, sponging or foaming may be accomplished by direct injection of gas and/or liquid (e.g., water, $CO_2$, $N_2$) into the rubber in an extruder, for foaming after passing the composition through a die; and Various other additives may also be included, such as antioxidants (e.g., 1,2-dijydro-2,2,4-trimethylquinoline), stabilizers, anticorrosion agents, UV absorbers, antistatics, slip agents, moisture absorbents (e.g., calcium oxide), pigments, dyes or other colorants.

The at least partially cross-linked polymer compositions of the present disclosure are formed by mixing the above-described components in any suitable manner described in the Polymer Blending section above, e.g., Banbury mixer. Mixing in these embodiments may include any one or more of typical mixing processes for EP(D)M compositions, such as open mill mixing, mixing using internal mixers or kneaders, and extrusion (e.g., through a twin-screw extruder).

Further, in some embodiments, additives may be incorporated into a polymer blend directly or as part of a masterbatch, i.e., an additive package containing several additives to be added at one time in predetermined proportions. The masterbatch may be added in any suitable amount. For example, a masterbatch comprising an additive may be used in an amount ranging from about 0.1 to about 10 wt %, or from about 0.25 to about 7.5 wt %, or from about 0.5 to about 5 wt %, or from about 1 to about 5 wt %, or from about 2 to about 4 wt %, based on the total weight of the polymer blend and the masterbatch. This is a common practice in polymer processing, typically used for addition of color, additives, and fillers to final compositions. Dispersion (or "letdown") of the masterbatch may take place as part of a processing step used to fabricate articles, such as in the extruder on an injection molding machine or on a continuous extrusion line, or during a separate compounding step.

EXAMPLES

Polymer Formation:

Second polymers (ethylene-based copolymers) were purchased from commercial sources. First polymers (PEDMs) were synthesized as follows: The reactor was a 0.15-liter reactor. The reactor was a stainless steel autoclave reactor equipped with a stirrer, a water cooling/steam heating element (with a temperature controller), and a pressure controller, made by Autoclave Engineers, Erie Pa. The reactor was designed to operate at a maximum pressure and temperature of 2000 bar (30 kpsi) and 225° C., respectively, although for the current experiments, the nominal reactor pressures were lower, from 1600 to 1700 psig. The nominal reactor vessel volume was 150 mL. A pressure transducer measured the pressure in the reactor. The reactor temperature was measured using a type-K thermocouple. A flush-mounted rupture disk located on the side of the reactor provided protection against catastrophic pressure failure. All product lines were heated to ~120° C. to prevent fouling. The reactor had an electric heating band that was controlled by a programmable logic control device (PLC). Except for the heat losses to the environment, the reactor did not have cooling (close to adiabatic operations).

Solvents (isohexane) and comonomers (propylene, ethylene, and ENB) were first purified by passing through a three-column purification system. The purification system consisted of an Oxiclear column (Model #RGP-R1-500 from Labclear) followed by a 5 Angstrom and a 3 Angstrom molecular sieve column. Purification columns were regenerated periodically whenever there was evidence of lower activity of polymerization. Both the 3 Angstrom and 5 Angstrom molecular sieve columns were regenerated in-house under nitrogen at a set temperature of 260° C. and 315° C., respectively. The molecular sieve material was purchased from Aldrich. Ethylene was delivered as a gas solubilized in the chilled solvent/monomer mixture. The purified solvents and monomers were then chilled to −15° C. by passing through a chiller before being fed into the reactor through a manifold. Solvent and monomers were mixed in the manifold and fed into reactor through a single tube. Catalyst and monomer contacts took place in the reactor. All liquid flow rates were measured using mass flow controllers.

All catalyst solutions were kept in an inert atmosphere and fed into reactor using an ISCO syringe pump. Tri-n-octylaluminum (TNOAL) solution (available from Sigma Aldrich, Milwaukee, Wis.) was further diluted in isohexane and used as a scavenger. Scavenger feed rate was adjusted to maximize the catalyst efficiency. The catalyst was 1,1'-bis(4-triethylsilylphenyl)methylene-(cyclopentadienyl)(2,7-di-tertiary-butyl-fluoren-9-yl)hafnium dimethyl. Other Cs symmetry metallocene precursors with good diene incorporation and MW capabilities could also be used such as those described herein. The activator was N,N-dimethylanilinium tetrakis(pentafluorophenyl)borate. Other non-coordinating anion type activators or methyl alumoxane (MAO) could also be used.

The reactor was first prepared by continuously $N_2$ purging at a maximum allowed temperature, then pumping isohexane and scavenger solution through the reactor system for at least one hour. Monomers and catalyst solutions were then fed into the reactor for polymerization. Once the activity was established and the system reached equilibrium, the reactor was lined out by continuing operation of the system under the established condition for a time period of at least five times of mean residence time prior to sample collection. The conversion in the reactor was monitored by an on-line gas chromatograph (GC) that sampled both the feed and the effluent. The GC analysis utilized the propane impurity present in the propylene feed as internal standard. The reactor temperature and the temperature difference across the reactor wall were maintained constant by adjusting the reactor heater output (skin temperature) and the catalyst feed rate.

The resulting mixture, containing mostly solvent, polymer and unreacted monomers, was collected in a collection box. The collected sample (PEDM C) was washed with xylene to remove unreacted macromers, and then air-dried in a hood to evaporate most of the solvent followed by drying in a vacuum oven at a temperature of 90° C. for 12 hours. The vacuum oven-dried sample was weighed to obtain yields. The reaction was carried out at a gauge pressure of 2.4 MPa.

Characterization of the PEDM C sample is provided in Table 1 below.

Polymers:

Table 1 illustrates the polymer characteristics of the example EP(D)M and PEDM polymer used in the examples of this invention. The PEDM polymer was synthesized using metallocene catalyst: 1,1'-bis(4-triethylsilylphenyl)methylene-(cyclopentadienyl)(2,7-di-tertiary-butyl-fluoren-9-yl) hafnium dimethyl and activator: N,N-dimethylanilinium tetrakis(pentafluorophenyl)borate.

TABLE 1

| Polymer | Mooney Viscosity (1 + 4) 125° C. (MU) - ASTM D1646 | Ethylene Content (wt %) - ASTM D3900 | ENB Content (wt %) - ASTM D6047 | Melt Flow Rate (g/10 min) - ASTM D1238 | Tg (° C.) |
|---|---|---|---|---|---|
| Vistalon ™ 7602 | 65 | 55 | 7.5 | — | — |
| PEDM C | 14 | 15 | 2.9 | 7.2 | −20.5 |

Compositions:

Compositions comprising EP(D)M polymer, carbon black, oil and curatives were prepared in a 4300 cc Banbury® Mixer. Table 2 shows the representative compositions. A mix was adopted for compounding using a fill factor of 70%. At the start of mixing, polymer, carbon black and additives were introduced with the rotor speed at 50 rpm. The ram was raised three times during the mixing cycle (60° C., 93° C., and 116° C.). Mixing was continued for 5 minutes at which time the batch was discharged. The temperature of the discharged batch on an average was about 138° C. About 5 grams of the compound masterbatch was isolated for rheology measurements.

TABLE 2

| Example | | C1 |
|---|---|---|
| Vistalon ™ 706 | | 100 |
| PEDM C | | 0 |
| Component | Density | Phr |
| First Pass | | |
| Polymer | 0.864 | 100 |
| Black 330 | 1.800 | 100 |
| Calcium Carbonate | 2.710 | 30 |
| Dymalink 708 (ZDMA) | 1.500 | 0 |
| Sunpar 2280 | 0.899 | 75 |
| Zinc Oxide | 5.600 | 5 |
| Stearic Acid | 0.941 | 1 |
| Escorez 1102 | 0.970 | 3 |
| PEG 3350 | 1.130 | 1.5 |
| Second Pass | | |
| Sulfur | 1.500 | 1.5 |
| MBT | 1.330 | 0.5 |
| MBTS | 1.350 | 1 |
| TMTD | 1.290 | 0.6 |
| DPTTS | 1.500 | 0.8 |
| Specific Gravity | | 1.162 |
| Total phr (First Pass) | | 316 |
| Total phr | | 320 |
| Batch Factor | | 10.9 |
| Batch Wt. (gm) | | 3498 |
| Fill Factor (%) | | 70 |
| Mixer Volume (cc) | | 4300 |

The curatives were added to the masterbatch in a second pass. The batches containing the curatives were cured in an electric press and tested for various physical and mechanical properties.

Rubber-to-rubber tack properties of the un-vulcanized compound was measured according to ASTM D 3330 Method F Modified. In particular, the following modifications to the ASTM method were utilized: (1) instead of a 2µ finish stainless steel substrate per the ASTM method, an uncured rubber sheeting substrate was used; (2) for conditioning, instead of the 24 hrs at 23° C. in the ASTM method, the sample was conditioned for 1 minute at the test temperature; and (3) test temperature was within the range from 40° C. to 60° C. instead of 23° C. per the ASTM method. This method provides the benefit of a larger test area and longer dwell time, thus providing more extensive testing of the sample versus the Tel-Tak method.

FIG. 1 shows the tack properties of formulations containing varying levels of PEDM C in the compound. At 5 phr level of PEDM C (95 phr Vistalon™7602/5 phr PEDM C), the rubber-to-rubber tack is enhanced from 1184 gm force/inch width to 2370 gm force/inch width, which is a 100% improvement over the control. The rubber-to-rubber tack further increases to 2571 gm force/inch width at 10 phr PEDM C, beyond which there is no further enhancement. The formulation containing 100 phr PEDM C (no Vistalon™ 7602) shows lower tack relative to the compound containing 5 phr of PEDM C.

FIG. 2 shows the green strength represented by 25% Modulus, the stress measured at 25% extension of the un-vulcanized compound. The green strength is marginally lower in both the 5 and 10 phr PEDM C formulations with reference to the control Vistalon™ 7602 compound, but increases relative to the control at 15 and 20 phr PEDM C respectively.

Improvement in tack normally occurs at the expense of green strength, as seen with the 5 phr and the 10 phr formulation respectively. However, the 15 and 20 phr PEDM C compounds show a surprising enhancement in both tack and green strength with reference to the control Vistalon™ 7602 compound.

Table 3 shows the compound properties of the comparative and the inventive formulations at varying levels of PEDM C, ranging from 5 phr to 100 phr. The compound viscosity, represented by compound Mooney, decreases from 40 MU to 12 MU at 100 phr PEDM C. Lower compound Mooney is desirable as it enhances processability. Cure rate decreases from 14 dN·m/min in the control formulation to 12 dN·m/min at 10 phr PEDM C.

The cure state MH-ML, does not change with increasing PEDM C, with the exception of Example 5 (100 phr PEDM C). The compound tensile strength is comparable to the control Example C formulation, with the exception of Example 5, where the tensile strength decreases to 7.5 MPa. The compound properties of Table 3 illustrate that the formulations containing up to 20 phr PEDM C, more or less maintain the properties with reference to the control. The compound containing 100 phr PEDM C (Example 5) has higher rubber-to rubber tack compared to the control; but substantially diminished cure and tensile properties.

TABLE 3

| Example | | C1 | 1 | 2 | 3 | 4 | 5 |
|---|---|---|---|---|---|---|---|
| Vistalon ™ 7602 | | 100 | 95 | 90 | 85 | 80 | 0 |
| PEDM C | | 0 | 5 | 10 | 15 | 20 | 100 |
| Compound Viscosity ML (1 + 4) 100° C. | MU | 40 | 33 | 32 | 30 | 29 | 12 |
| Mooney Scorch at 125° C. - ASTM D5289 | | | | | | | |
| t1 | min | 4.1 | 5.6 | 5.6 | 5.7 | 5.5 | 9.4 |
| t5 | min | 5.8 | 8.3 | 8.4 | 8.6 | 8.9 | 15.6 |
| t10 | min | 6.6 | 9.7 | 10.0 | 10.1 | 10.5 | 17.4 |
| MDR 180° C., 0.5 deg - ASTDM D5289 | | | | | | | |
| ML | dN · m | 1.5 | 1.2 | 1.2 | 1.1 | 1.0 | 0.4 |
| MH | dN · m | 12.0 | 13.9 | 12.5 | 11.5 | 11.1 | 9.5 |
| MH − ML | dN · m | 10.5 | 12.7 | 11.4 | 10.4 | 10.1 | 9.1 |

TABLE 3-continued

| Example | | C1 | 1 | 2 | 3 | 4 | 5 |
|---|---|---|---|---|---|---|---|
| ts2 | min | 0.6 | 0.8 | 0.8 | 0.8 | 0.8 | 1.1 |
| t80 | min | 1.4 | | 2.7 | 2.1 | 2.0 | 3.5 |
| Peak Rate | dN · m/min | 14.3 | 11.9 | 11.8 | 10.8 | 10.8 | 6.7 |
| Press Cure, 10 min at 180° C. | | | | | | | |
| Hardness - ASTM D2240 | Shore A | 61 | 62 | 63 | 62 | 62 | 54 |
| 100% Modulus - ASTM D412 | MPa | 3.1 | 3.8 | 3.8 | 3.7 | 3.7 | 1.9 |
| 300% Modulus- ASTM D412 | MPa | 10.2 | 10.9 | | 10.8 | 10.6 | 5.3 |
| Stress@Break- ASTM D412 | MPa | 11.5 | 11.8 | 10.4 | 11.1 | 10.9 | 7.5 |
| Strain@Break- ASTM D412 | % | 348 | 331 | 270 | 310 | 314 | 474 |
| Tear Die C (Peak Value) - ASTM D624 | N/mm | 39.6 | 33.8 | 32.9 | 32.5 | 29.9 | 30.0 |
| Rubber-to-Rubber Tack | | | | | | | |
| Peak Force | gm force/inch width | 1184 | 2370 | 2571 | 1928 | 2150 | 1698 |
| Std. dev | gm force/inch width | 143 | 367 | 238 | 192 | 277 | 286 |
| Coefficient of Variation | % | 12.1 | 15.5 | 9.3 | 10.0 | 12.9 | 16.8 |
| Compound Green Strength | | | | | | | |
| 10% Modulus | MPa | 0.25 | 0.22 | 0.24 | 0.28 | 0.28 | 0.21 |
| 25% Modulus | MPa | 0.31 | 0.26 | 0.27 | 0.33 | 0.32 | 0.24 |

All documents described herein are incorporated by reference herein, including any priority documents and/or testing procedures to the extent they are not inconsistent with this text. As is apparent from the foregoing general description and the specific embodiments, while some embodiments have been illustrated and described, various modifications can be made without departing from the spirit and scope of the disclosure. Accordingly, it is not intended that the disclosure be limited thereby. Likewise, the term "comprising" is considered synonymous with the term "including." Likewise whenever a composition, an element or a group of elements is preceded with the transitional phrase "comprising", it is understood that we also contemplate the same composition or group of elements with transitional phrases "consisting essentially of," "consisting of", "selected from the group of consisting of," or "is" preceding the recitation of the composition, element, or elements and vice versa.

We claim:
1. A composition comprising:
   from 5 to 20 parts by weight per hundred parts by weight rubber (phr) of a propylene-α-olefin-diene (PEDM) terpolymer comprising 1 to 10 wt % diene, 5 to 40 wt % α-olefin, and 15 to 85 wt % propylene, said wt % based on the weight of the PEDM terpolymer; and
   from 80 to 95 phr of an ethylene-based copolymer comprising ethylene, one or more $C_3$ to $C_{12}$ α-olefins, and, optionally, one or more dienes; wherein the amount of ethylene content of the ethylene-based copolymer (in wt% on the basis of total weight of the ethylene-based copolymer) is greater than the amount of a-olefin content of the PEDM terpolymer (in wt % on the basis of total weight of the PEDM terpolymer).
2. The composition of claim 1, wherein the amount of the PEDM terpolymer in the composition is from 10 to 20 phr.
3. The composition of claim 1, wherein the PEDM is formed by polymerizing propylene, one or more α-olefins, and one or more dienes in the presence of a bridged fluorenyl-cyclopentadienyl group 4 catalyst that has been activated by an activator;

wherein the catalyst is represented by Formula (I):

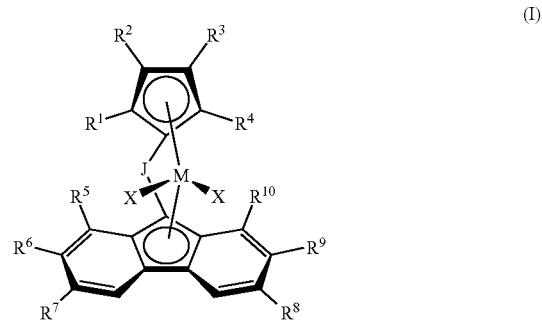

wherein J is a divalent bridging group;
M is a group 4 transition metal;
each X is independently a univalent anionic ligand, or two Xs are joined together to form a metallocycle ring with M, or two Xs are joined to form a chelating ligand, a diene ligand, or an alkylidene ligand;
each $R^1$, $R^2$, $R^3$, $R^4$, $R^5$, $R^6$, $R^7$, $R^8$, $R^9$, and $R^{10}$ is independently hydrogen, $C_1$-$C_{50}$ substituted or unsubstituted alkyl, provided that any one or more of the pairs $R^1$ and $R^2$, $R^3$ and $R^4$, $R^5$ and $R^6$, $R^6$ and $R^7$, $R^8$ and $R^9$, and $R^9$ and $R^{10}$, may optionally be bonded together to form a saturated or partially saturated cyclic or fused ring structure; and
the activator is a non-coordinating anion activator.
4. The composition of claim 3, wherein the bridged fluorenyl-cyclopentadienyl group 4 catalyst is 1,1'-bis(4-triethylsilylphenyl) methylene(cyclopentadienyl)(2,7-di-tertiary-butyl-fluoren-9-yl) hafnium dimethyl.
5. The composition of claim 3, wherein the activator is N,N-dimethylanilinium tetrakis(pentafluorophenyl)borate.
6. The composition of claim 1, wherein the PEDM terpolymer has a $H_f$ less than 1 J/g.
7. The composition of claim 1, wherein the PEDM terpolymer has a crystallinity of from 0.1% to 5%.
8. The composition of claim 1, wherein the PEDM terpolymer has atactic propylene sequences.

9. The composition of claim 1, wherein the PEDM terpolymer has an α-olefin that is ethylene and an ethylene content from 30 wt % to 40 wt %.

10. The composition of claim 1, wherein the diene of the PEDM terpolymer is one or more of 5-ethylidene-2-norbornene, dicyclopentadiene, 5-vinyl-2-norbornene, 1,4-hexadiene, alkyldicyclopentadiene, 1,4-pentadiene, 1,5-hexadiene, 1,4-heptadiene, 2-methyl-1,5-hexadiene, cyclooctadiene, 1,4-octadiene, 1,7-octadiene, 5-n-propylidene-2-norbornene, 5-(2-methyl-2-butenyl)-2-norbornene, and norbornadiene.

11. The composition of claim 10, wherein the diene of the PEDM terpolymer is 5-ethylidene-2-norbornene.

12. The composition claim 1, wherein the PEDM terpolymer has a diene content from 2 wt % to 4 wt %.

13. The composition of claim 1, wherein the ethylene-based copolymer comprises 40 to 95 wt % ethylene, 0 to 10 wt % of one or more dienes, and a $C_3$ to $C_{12}$ α-olefin, said wt % s based on the total weight of the ethylene-based copolymer.

14. The composition of claim 1, wherein the $C_3$ to $C_{12}$ α-olefin of the ethylene-based copolymer is propylene or 1-butene.

15. The composition of claim 1, wherein the $C_3$ to $C_{12}$ α-olefin of the ethylene-based copolymer is propylene.

16. An article comprising a composition according to claim 1.

17. An at least partially cross-linked elastomeric composition that is the reaction product of:
   a composition according to claim 1;
   one or more vulcanization activators; and
   one or more vulcanizing agents.

18. The composition of claim 17, further comprising one or more additives comprising at least one of carbon black and/or process oil.

19. The composition of claim 17, wherein the composition comprises from 1 phr to 150 phr of a paraffinic process oil, the paraffinic process oil having a viscosity at 40° C. within the range from 80 to 600 CSt.

20. The composition of claim 17, further comprising a mineral filler.

21. The composition of claim 1, wherein the composition has a tack of greater than about 1,700 gm/inch-width.

* * * * *